No. 765,154. PATENTED JULY 12, 1904.
H. SWEET.
DEVICE FOR FEEDING SOLUTIONS TO BOILERS.
APPLICATION FILED SEPT. 12, 1903.
NO MODEL.
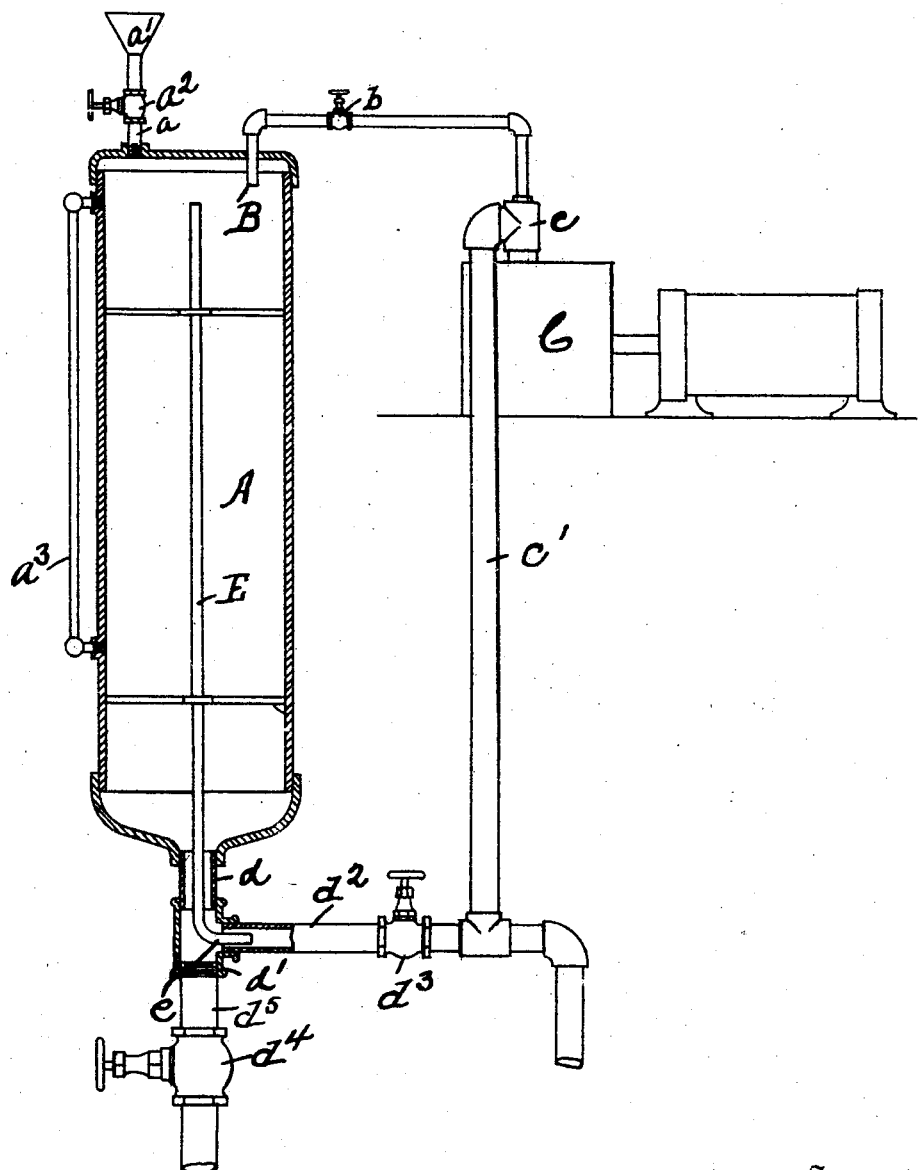
Witnesses
Inventor
Hollie Sweet
Attorney No. 765,154. Patented July 12, 1904.

UNITED STATES PATENT OFFICE.

HOLLIE SWEET, OF GIRARD, PENNSYLVANIA.

DEVICE FOR FEEDING SOLUTIONS TO BOILERS.

SPECIFICATION forming part of Letters Patent No. 765,154, dated July 12, 1904.

Application filed September 12, 1903. Serial No. 172,921. (No model.)

*To all whom it may concern:*

Be it known that I, HOLLIE SWEET, a citizen of the United States, residing at Girard, in the county of Erie and State of Pennsylvania, have invented new and useful Improvements in Devices for Feeding Solutions to Boilers, of which the following is a specification.

This invention relates to devices for feeding solutions to boilers and the like; and it consists in certain improvements in the construction thereof, as will be hereinafter fully described, and pointed out in the claims.

The object of the invention is to provide means whereby a solution may be fed when desired gradually to a boiler under pressure.

In the accompanying drawings the device is shown in a sectional elevation.

A marks the receptacle into which the solution is placed. It has the pipe $a$ leading to it, which is provided with a funnel $a'$ for this purpose. The pipe is provided with a valve $a^2$, so that when the receptacle is connected with the system leading to the boiler it will prevent the egress of the liquid through the pipe $a$. The receptacle is provided with a glass $a^3$, so that the level of solution in the receptacle may be determined. The pipe B leads into the upper end of the receptacle. It is connected with the outlet $c$ of the pump C. A passage $c'$ leads from the outlet $c$ to the boiler and forms the main way for the water from the pump to the boiler. The pump C forms the means for forcing the water to the boiler. Any means of forcing water to the boiler may of course be substituted for the pump. The pipe B is provided with the valve $b$ for closing off the water system while the receptacle A is being filled. The receptacle is provided with the outlet $d$, which extends into a T $d'$. From this T extends the pipe $d^2$, which connects the receptacle by way of the outlet $d$ with the main water-pipe $c'$. This passage $d^2$ is also provided with the valve $d^3$ for the same purpose as the valve $b$. Extending from the T is a pipe $d^5$. This is provided with a valve $d^4$, the purpose of the pipe $d^5$ being to drain the receptacle for the purpose of cleaning, &c. A pipe E extends from near the upper end of the receptacle through the outlet $d$. It is provided with a turn $e$, so that it extends into the pipe $d^2$. The pipe E is of a size to leave a passage around it through the outlet $d$ and the pipe $d^2$, the pipe $d^2$ and the pipe E forming confluent passages.

In the operation of the device the valves $b$ and $d^3$ are closed and the receptacle A filled through the pipe $a$. The valves $b$ and $d^3$ are then opened, connecting the receptacle with the water system. Water passes through the pipe B to the receptacle and liquid passes from the receptacle through both the pipe E and by way of the outlet $d$ and pipe $d^2$ around the pipe E. It has been found in practice that by this mechanism practically any feeding of solution desired may be effected, especially a very slow feed, with perfect uniformity. By having confluent outlet-passages a quantity of water is forced through the receptacle, taking up with it a small portion of the solution. Ordinarily the solutions are of a different specific gravity than water, and by the means here provided a very large volume of water may be passed through the receptacle as compared with the volume of solution taken along with it. By this means the amount of solution fed may be very accurately gaged.

What I claim as new is—

1. In a device for feeding solutions to boilers the combination of a receptacle for the solution; means for forcing a liquid into said receptacle; and means comprising confluent passages for conveying matter from the receptacle.

2. In a device for feeding solutions to boilers the combination of a receptacle for the solution; means for forcing a liquid into said receptacle; and means comprising confluent passages for conveying matter from the receptacle, said passages leading from different parts of the receptacle.

3. In a device for feeding solutions to boilers the combination of a receptacle for the solution; means for forcing a liquid into said receptacle; and means comprising confluent passages for conveying matter from the receptacle, said passages leading from opposite ends of the receptacle.

4. In a device for feeding solutions to boilers the combination of a receptacle for the solution; means for forcing a liquid into said receptacle; and means comprising confluent passages for conveying matter from the receptacle, one of said passages leading from the lower portion of said receptacle.

5. In a device for feeding solutions to boilers the combination of a receptacle for the solution; means for forcing a liquid into said receptacle; and means comprising confluent passages for conveying matter from the receptacle, one of said passages being arranged within the other.

6. In a device for feeding solutions to boilers the combination of a receptacle for the solution; means for forcing a liquid into said receptacle; and means comprising confluent passages for conveying matter from the receptacle, said passages leading from different portions of the receptacle, and one of said passages being arranged within the other.

7. In a device for feeding solutions to boilers the combination of a receptacle for the solution; means for forcing a liquid into said receptacle; means comprising confluent passages for conveying matter from the receptacle; and means for cutting off the receptacle from the water system for the purposes described.

8. In a device for feeding solutions to boilers the combination of the receptacle A having an opening for introducing solution and an outlet therefrom; the pipe B for forcing solution into the receptacle; the pipe E extending from near the top of the receptacle in the outlet and forming a confluent passage with the outlet, the end of the pipe E being bent and the outlet being extended in a horizontal direction; and the drain-pipe $d^5$.

In testimony whereof I have hereunto set my hand in the presence of two subscribing witnesses.

HOLLIE SWEET.

Witnesses:
E. H. HILER,
R. H. DUFF.